Sept. 12, 1961 HIDEO MIYAUCHI 2,999,444
TURRET DETENT MEANS
Filed Nov. 12, 1959
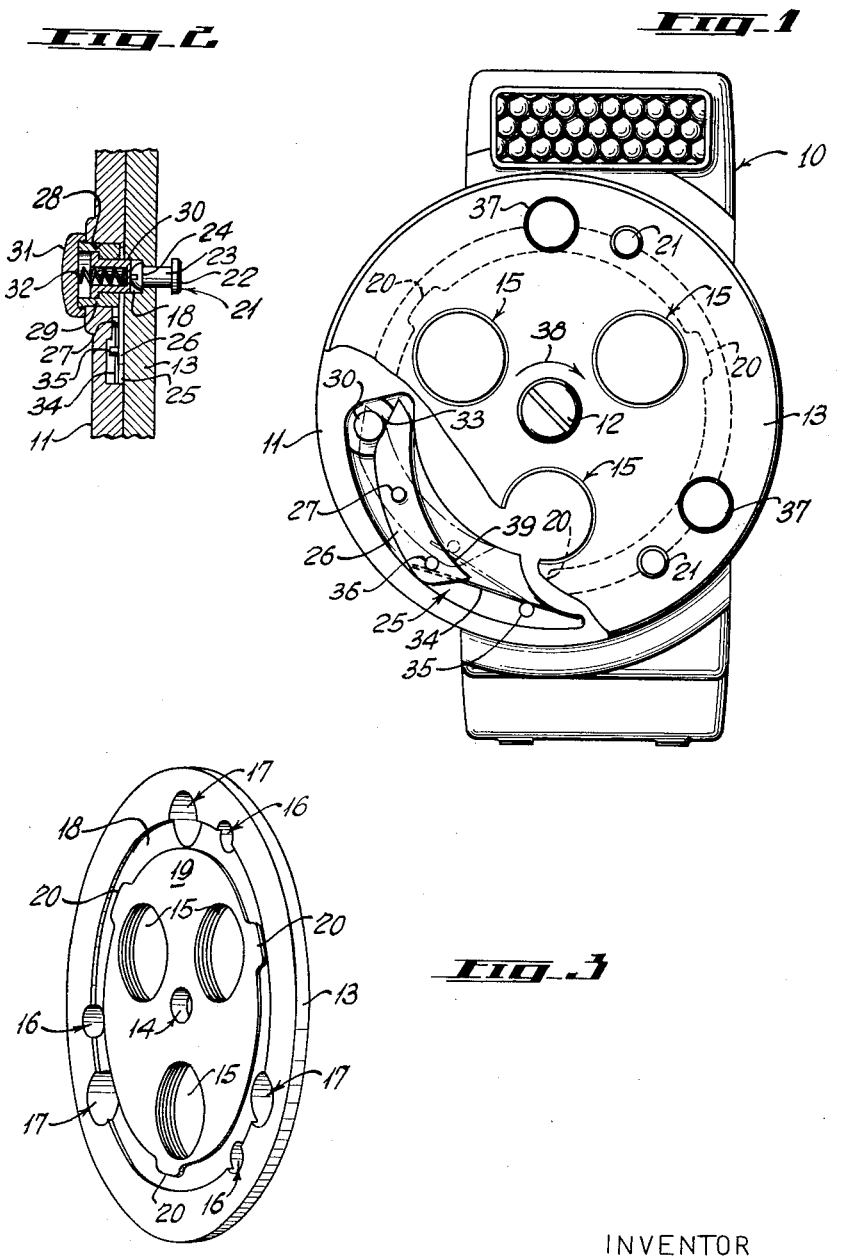
INVENTOR
HIDEO MIYAUCHI
By Stanley Wolder

2,999,444
TURRET DETENT MEANS
Hideo Miyauchi, Okaya-shi, Nagano-ken, Japan, assignor to Yashica Co., Ltd., Tokyo, Japan, a corporation of Japan
Filed Nov. 12, 1959, Ser. No. 852,522
Claims priority, application Japan Dec. 10, 1958
7 Claims. (Cl. 95—45)

The present invention relates to turret detent means employed most advantageously with a motion picture camera.

Presently, turrets adopted to carry several lenses sequentially into position along the optical axis of the camera lens system are usually carried by a turret head which is retained in each operative position by means of click stops, i.e. spring-biased ball bearings of the like, which fit into relative shallow depressions and which are easily disengaged by rotating the turret head. While such click-stop construction enables the ready rotation of the turret head since only slight rotational force is required, and since such force may be derived from shock or accidental friction, lenses so mounted may easily be displaced from the optical axis and hence cause faulty operation of the camera.

The principal object of the present invention is to provide detent means to securely lock a turret head into position so as to present a lens element in accurate alignment along the optical axis of the lens of the motion picture camera, and at the same time enable its rapid and simple unlocking and movement to one or more other positions.

Another object thereof is the provision of such detent means which employs apertures in the turret head, and which is effective even though there be other apertures or structures equally radially distant from the pivot point of the turret.

The above and other objects may be achieved by the preferred form of the present invention which includes the provision of a turret base affixed to the camera which carries a forwardly-biased pin adapted to enter detent apertures in the turret head rotatably secured to said base, there being provided a release button mounted in each of said detent apertures to disengage said pin, and a checking lever spring biased to hold said pin in a retracted position after its release from one of said apertures, which lever engages a cam surface and is displaced to free said pin for entry into the next detent aperture presented as the turret head is rotated.

Other objects and a fuller understanding of the present invention may be had by referring to the following detailed description and claims, taken in conjunction with the accompanying drawing which illustrates the preferred embodiment thereof, it being understood that the foregoing statement of the objects of the invention and the brief summary thereof is intended to generally explain the same without limiting it in any manner.

FIG. 1 is a front elevational view of a motion picture camera bearing a turret embodying the present invention, portions thereof being cut away to reveal the underlying structure.

FIG. 2 is a fragmentary cross sectional view taken from the left of FIG. 1 through a detent pin, release button, checking lever and associated mechanism.

FIG. 3 is a perspective view of the turret head taken from the rear thereof.

Referring now to the drawing wherein the preferred form of the present invention is illustrated, the same comprises a motion picture camera 10 to the front wall of which there is fixedly secured by means not shown a turret base 11, to which there is pivotally mounted by means of pivot screw 12 a turret head 13 in the form of a circular plate having a central bearing aperture 14 centrally radially disposed, threaded lens element apertures 15, and two series of alternately spaced equi-radially distant detent apertures 16 and finder apertures 17. The inner or rear surface of turret head 13 is depressed within a line connecting the centers of detent and finder apertures 16 and 17 to form a cavity 18 within which a centrally located elevated portion 19 is positioned, there being formed along the side walls of said elevated portion radially outwardly-extending protuberances or cams 20. Within each detent aperture 16, and extending forwardly therefrom there is positioned a release button 21 consisting of a head 22, a hollow internally-threaded shank 23, and a terminal round head machine screw 24.

Extending rearwardly from the forward or front face of turret base 11 there is a cavity 25 in which there is positioned a checking lever 26 pivotally mounted to said base by means of pivot pin 27. Through an aperture 28 in turret base 11 and extending into cavity 25, there is mounted a socket 29 having a stepped bore in which there is slidably mounted so as to extend forwardly of turret base 11 when in the extended position, a hollow detent pin 30, the socket being secured in place by end closure cap 31, pin 30 being biased towards its extended position by means of a spring 32.

A terminal portion of a side of checking lever 26 is bevelled to provide a contact portion 33. Checking lever 26 is biased in a counter-clockwise direction (as seen in FIG. 1) by means of a leaf spring 34 which extends at one end against an end wall of cavity 25, contacts an intermediate fulcrum pin 35, and then contacts the outer surface of a bias pin 36. It will be seen that, when in the position shown in FIG. 1, detent pin 30 has entered one of the detent apertures 16, then being in its extended position, contacting at its forward portion machine screw 24 of release button 11, its forward side walls contacting the wall of detent aperture 16, and thus securely locking turret head 13 in position and preventing rotary displacement thereof. In such position a lens element mounted in an aperture 15 will be presented in precise mechanical alignment and confrontation to a fixed lens element (not shown) mounted within the camera, and in exact optical alignment therewith. It will be noted too, that in such position of the turret head a finder lens 37 will be brought into confrontation or registry with the finder opening in the camera so that the particular finder lens assembly adapted to define the field of the particular lens brought into operational position by the positioning of turret head 13 may be placed in an operative location.

When it is sought to change the lens element placed along the optical axis of the camera, turret head 13 may be rotated in the direction of arrow 38 after unlatching the detent means. This is accomplished by pressing rearwardly on button 21, thus rearwardly displacing detent pin 27 and permitting the contact portion 33 of checking lever 26 to slide over the forward face of detent pin 30 to the extent permitted by the rounded surface of machine screw 24. As turret head 13 is further rotated, the contacting end of checking lever 26 passes further over the forward face of detent pin 30 (as shown in dot-dashed outline in FIG. 1) securing it in a retracted position and enabling the passage over the rear of the next-met finder aperture 17. As the head is rotated still further, however, the trailing portion of the arcuate inward wall of checking lever 26, which forms a cam surface 39, is brought into contact with the next-met cam 20 which displaces checking lever 26 about pivot pin 27 in a clockwise direction (as shown in FIG. 1) thereby releasing detent pin 30 which is urged toward its extended position, its forward edge then contacting the rear surface of turret head 13. Finally, when detent pin 30 is brought into registry with the next-met detent aperture 16 it enters the same, thus locking turret head 13 in its operational position, pivot pin 30 then being again in its extended position.

While there has been described and illustrated a preferred embodiment of the present invention, it is apparent that numerous alterations, omissions and additions may be made without departing from the spirit thereof.

What is claimed is:

1. Camera turret means for use with a camera which includes a camera body housing and a fixed lens mounted therein comprising a turret head rotatably mounted to the front wall of said body, said turret having formed therein sets of detents and of lens apertures, each said set including a plurality of the same number of equi-radially spaced apertures, detent means reciprocally mounted to said front wall to sequentially engage said detent apertures as said head is rotated, resilient means biasing said detent means toward a forward position, said apertures being spaced so that as one of said lens apertures registers with said fixed lens said detent means engages a detent aperture and blocking means comprising a checking lever pivotally connected to said front wall of said camera housing, means connected to said camera housing and lever biasing a first end of said lever towards said detent means and forward of the same when said detent means are displaced from said forward position thereof, and check means to contact said lever and move said first end thereof away from said detent means as said turret head is rotated, thereby freeing said detent means for entry into the next-met detent aperture as said head is further rotated.

2. Camera turret means as described in claim 1, said check means including a plurality of cam surfaces positioned on the rear of said head.

3. Camera turret means for use with a camera which includes a camera body and a fixed lens mounted therein comprising a turret head rotatably mounted to the front wall of said body, said turret head having formed therein a plurality of equi-radially disposed detent apertures, a detent pin connected to said front wall of said camera housing and reciprocally mounted with respect thereto to move forwardly to and rearwardly from a forward position, spring means connected to said front wall and pin biasing said pin towards said forward position, said pin being positioned to sequentially register with and enter said detent apertures as said head is rotated, release means to disengage said detent pin from said detent apertures, said head having also formed therein a plurality of lens apertures equal in number to said detent apertures and equi-radially spaced so that one such lens aperture registers with said fixed lens when said pin enters a detent aperture, and blocking means mounted to the front wall of said body engageable with said detent pin and preventing the latter from engaging the confronting surface of said turret head during at least a portion of the intervals between successive detent apertures as said head is rotated, said head having formed therein a plurality of finder apertures equal in number to said detent apertures and equally radially distant from the axis of rotation of said turret head as said detent apertures and equally spaced in the intervals between detent apertures in the portions thereof in which said detent pin is prevented from contacting said head by said blocking means.

4. Camera turret means for use with a camera which includes a camera body and a fixed lens mounted therein comprising a turret base secured to the front wall of said body, a turret head rotatably mounted to the front wall of said base, said turret head having formed therein a plurality of equi-radially disposed detent apertures, a detent pin connected to said front wall of said base and reciprocally mounted with respect thereto to move forwardly to and rearwardly from a forward position, spring means connected to said base and pin biasing said pin towards said forward position thereof, said pin being positioned to sequentially register with and enter said detent apertures as said head is rotated, release means for said detent pins including a captive pin reciprocally mounted in each of said detent apertures and extending forwardly thereof, said head having also formed therein a plurality of lens apertures equal in number to said detent apertures and equi-radially spaced so that one such lens aperture registers with said fixed lens when said pin enters a detent aperture, the front wall of said base having a depression formed therein, a checking lever pivotally mounted to said base and lying within said depression, spring means connected to said camera housing and lever biasing a first end of said lever towards said pin and forward of the same when said pin is retracted from its forward position preventing said pin from contacting the confronting rear face of said turret head, a plurality of cam surfaces positioned on the rear of said head to contact said lever and move said first end thereof away from said pin after said turret head is rotated a predetermined distance, thereby freeing said pin for entry into the next-met detent aperture as said head is further rotated.

5. Camera turret means as described in claim 4, said head having formed therein a plurality of finder apertures equally radially distant from the axis of rotation of said head as said detent apertures and equally spaced in the intervals between detent apertures in the portions thereof in which said detent pin is prevented from contacting said turret head by said checking lever.

6. Camera turret means for use with a camera which includes a camera body and a fixed lens mounted therein comprising a turret head rotatably mounted to the front wall of said body, said turret head having formed therein a plurality of equi-radially disposed detent apertures, a detent pin connected to said front wall of said camera housing and reciprocally mounted with respect thereto to move forwardly to and rearwardly from a forward position, spring means connected to said front wall and pin biasing said pin towards said forward position, said pin being positioned to sequentially register with and enter said detent apertures as said head is rotated, release means to disengage said detent pin from said detent apertures, said head having also formed therein a plurality of lens apertures equal in number to said detent apertures and equi-radially spaced so that one such lens aperture registers with said fixed lens when said pin enters a detent aperture, and blocking means mounted to the front wall of said body engageable with said detent pin and preventing the latter from engaging the confronting surface of said turret head during at least a portion of the intervals between successive detent apertures as said head is rotated, said blocking means including a checking lever pivotally connected to said front wall of said camera housing, spring means connected to said camera housing and lever biasing a first end of said lever towards said pin and forward of the same when said pin is retracted from its forward position, a plurality of cam surfaces positioned on the rear of said head to contact said lever and move said first end thereof away from said pin as said turret head is rotated, thereby freeing said pin for entry into the next-met detent aperture as said head is further rotated.

7. Camera turret means for use with a camera which includes a camera body and a fixed lens mounted therein comprising a turret head rotatably mounted to the front wall of said body, said turret head having formed therein a plurality of equi-radially disposed detent apertures, a detent pin connected to said front wall of said camera housing and reciprocally mounted with respect thereto to move forwardly to and rearwardly from a forward position, spring means connected to said front wall and pin biasing said pin towards said forward position, said pin being positioned to sequentially register with and enter said detent apertures as said head is rotated, release means to disengage said detent pin from said detent apertures, said release means comprising a captive pin reciprocally mounted in each of said detent apertures and extending forwardly thereof, said head having also formed therein a plurality of lens apertures equal in number to said detent apertures and equi-radially spaced so that one such lens aperture registers with said fixed lens when said pin enters a detent aperture, and blocking means mounted to the front wall of said body engageable with said detent pin and preventing the latter from engaging the confronting surface of said turret head during at least a portion of the intervals between successive detent apertures as said head is rotated.

References Cited in the file of this patent

UNITED STATES PATENTS 2,682,192    Bolsey ------------------ June 29, 1954